United States Patent
Gibson

(10) Patent No.: US 10,145,732 B1
(45) Date of Patent: Dec. 4, 2018

(54) SYSTEMS AND METHODS FOR MEASURING ULTRAVIOLET EXPOSURE

(71) Applicant: Verily Life Sciences LLC, Mountain View, CA (US)

(72) Inventor: David Gibson, Mountain View, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 0 days.

(21) Appl. No.: 15/405,803

(22) Filed: Jan. 13, 2017

(51) Int. Cl.
*G01J 1/42* (2006.01)
*G01J 1/04* (2006.01)

(52) U.S. Cl.
CPC ............. *G01J 1/429* (2013.01); *G01J 1/0425* (2013.01)

(58) Field of Classification Search
CPC ................................ G01J 1/0425; G01J 1/429
See application file for complete search history.

(56) References Cited

U.S. PATENT DOCUMENTS

| | | | | |
|---|---|---|---|---|
| 9,880,052 B2* | 1/2018 | Dumont | ................. | G01J 1/4204 |
| 9,880,725 B2* | 1/2018 | Dumont | .............. | G06F 3/04847 |
| 2007/0073487 A1* | 3/2007 | Albright | ................... | G01J 1/02 |
| | | | | 702/3 |
| 2015/0041664 A1* | 2/2015 | Anderson | ............... | G01J 1/429 |
| | | | | 250/372 |
| 2015/0313532 A1* | 11/2015 | Marinkovich | ....... | A61B 5/1032 |
| | | | | 600/306 |
| 2016/0363479 A1* | 12/2016 | Dumont | ................ | G01J 1/0271 |
| 2016/0364131 A1* | 12/2016 | Dumont | ................ | G01J 1/0271 |
| 2017/0115162 A1* | 4/2017 | Dumont | .................. | G01J 1/429 |
| 2017/0118854 A1* | 4/2017 | Dumont | ............... | H05K 5/0247 |

\* cited by examiner

*Primary Examiner* — Mark R Gaworecki
(74) *Attorney, Agent, or Firm* — Perkins Coie LLP

(57) ABSTRACT

This disclosure relates to measuring ultraviolet (UV) exposure. One example system includes an electronic sensor chip that includes a UV sensor that measures a UV intensity reading, an inertial measurement unit that acquires movement data of the UV sensor, and at least one processor. The system further includes a light pipe that guides light towards the UV sensor and a diffuser that has an angle-dependent transmission function and covers an end of the light pipe. Example operations can be performed by the processor include determining a solar incidence angle between a direction of the sun and a normal direction of the UV sensor, computing an estimation of a maximum UV intensity at normal incidence based on the UV intensity reading, the solar incidence angle, and the angle-dependent transmission function of the diffuser, and outputting a UV index based on the estimation of the maximum UV intensity at normal incidence.

24 Claims, 9 Drawing Sheets

$I_{sensor} = I_{horiz} \cos\_d(\theta_{sensor})$
$I_{horiz} = I_{sensor} / \cos\_d(\theta_{sensor})$
$\theta_{sensor} = \theta_{sun}$
$I_{horiz} = I_{sensor} \cos\_d(\theta_{sun})$
$I_{max} = I_{sensor} / \cos\_d(\theta_{sun} - \theta_{sensor})$
$I_{horiz} = I_{max} \cos\_d(\theta_{sun})$
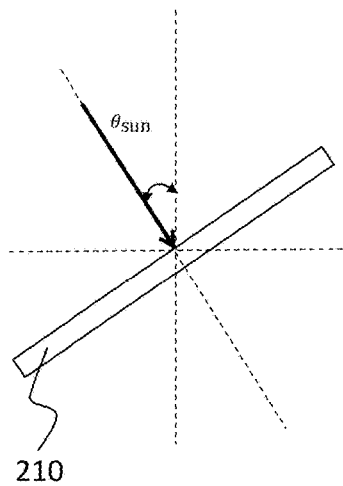
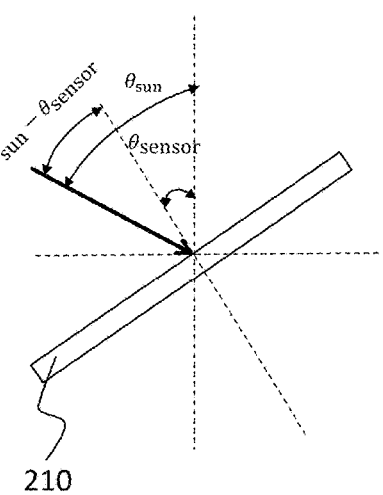
FIG. 6A   FIG. 6B   FIG. 6C

SYSTEMS AND METHODS FOR MEASURING ULTRAVIOLET EXPOSURE

BACKGROUND

Technical Field

The present disclosure generally relates to measuring ultraviolet (UV) exposure. More particularly, and without limitation, the disclosed embodiments relate to systems and methods for measuring UV exposure through the use of a portable device.

Background Description

Ultraviolet (UV) light radiated by the sun consists of radiation having wavelengths ranging from 100 nm to 400 nm. Exposure to UV radiation has a beneficial effect in smaller doses, such as contributing to the synthesis of vitamin D. However, excessive exposure to UV radiation can be harmful and may lead to skin cancer, such as melanoma. Over the past thirty years, the number of people who have experienced skin cancer has dramatically increased, making people more aware of gauging their exposure to UV radiation to an optimum healthy level.

UV radiation includes ultraviolet A ("UVA") radiation, ultraviolet B ("UVB") radiation, and ultraviolet C ("UVC") radiation. UVA radiation has wavelengths ranging from 320 nm to 400 nm, longer than those of UVB radiation or UVC radiation. UVB radiation has wavelengths ranging from 280 nm to 320 nm, while UVC radiation has wavelengths less than 280 nm. Most of the ultraviolet radiation that passes through the earth's atmosphere is UVA radiation and UVB radiation. The longer-wavelength UVA radiation penetrates human skin more readily. Excessive UVA exposure can affect connective tissue and blood vessels and cause skin to tan and wrinkle. However, the more energetic UVB radiation can be more harmful because it can cause damage to DNA, leading to sunburn and potentially irreversible genetic damage and the development of cancerous tumor. The shorter-wavelength UVC radiation does not penetrate the earth's atmosphere, but can have the most damaging effect that is utilized in industrial sterilization applications.

Various factors affect the amount of exposure to UV radiation. For example, the distance that the UV light travels through the earth's atmosphere affects the amount of adsorption of UV radiation by the atmosphere. UV radiation reaches locations of higher altitudes in a shorter distance, which results in less atmospheric absorption and higher UV exposure at these locations. Moreover, the time of day, seasonality, latitude, and the presence of clouds and dust affect the amount of UV radiation that a person encounters outdoors. The variation of the amount of exposure to UV radiation is further complicated by the concentration of the ozone in the atmosphere, which strongly absorbs UVB radiation. For example, at higher latitudes, typically less ozone is present in the atmosphere, which increases the amount of exposure to UVB radiation.

The World Health Organization developed and standardized a UV Index as a measure of the risk of harm of UV radiation at a particular place and time, providing a guide for people to take preventative measures to maintain UV exposure at an optimal level. The UV index provides a numeric value, normally ranging from 0 to 11, and is related linearly to the intensity of UV radiation in the sunlight. The UV index changes throughout the day with the direction of the sun and with varying cloud conditions and air pollutants levels. Because UVA radiation and UVB radiation have different effects and impose different risks of harm to human skin, the UV index is calculated according to the International Lighting Commission (CIE) standard McKinlay-Diffey Erythemal Action Spectrum. The CIE standard technically expresses the risk of developing sunburn, which is caused mostly by UVB radiation.

Preventive measurements of UV exposure, such as the UV index, are beneficial to public health by providing an early warning when people have reached unhealthy levels of UV exposure. Portable or wearable devices having a UV sensor can provide a convenient means for obtaining the UV index, allowing one to determine how long they can stay outside in the sun and what adequate protection to take (e.g., sun screen, shades, hats, and other protective clothing).

SUMMARY

The embodiments of the present disclosure include systems and methods for measuring UV exposure. Advantageously, the exemplary embodiments improve the accuracy of the determination of the UV index by a portable UV sensing device.

According to an exemplary embodiment of the present disclosure, a system for measuring UV exposure is described. The system includes an electronic sensor chip. The electronic sensor chip includes a UV sensor that measures a UV intensity reading, an inertial measurement unit that acquires movement data of the UV sensor, and at least one processor. The system further includes a light pipe that guides light towards the sensor ship and a diffuser that covers an end of the light pipe. The diffuser can have an angle-dependent transmission function that characterizes the angle-dependent transmission property of the diffuser. The at least one processor performs operations include determining a solar incidence angle between a direction of sun and a normal direction of the UV sensor, computing an estimation of a maximum UV intensity at normal incidence based on the UV intensity reading, the solar incidence angle, and the angle-dependent transmission function of the diffuser, and outputting a UV index based on the estimation of the maximum UV intensity at normal incidence.

According to a further exemplary embodiment of the present disclosure, a method for measuring UV exposure is described. The method includes the steps of measuring, by a UV sensor, a UV intensity reading; acquiring, by an inertial measurement unit, movement data of the UV sensor; and determining a solar incidence angle between a direction of the sun and a normal direction of the UV sensor. Light towards the UV sensor is guided by a light pipe and a diffuser having an angle-dependent transmission function covers an end of the light pipe. The method further includes computing an estimation of a maximum UV intensity at normal incidence based on the UV intensity reading, the solar incidence angle, and the angle-dependent transmission function of the diffuser, and outputting a UV index based on the estimation of the maximum UV intensity at normal incidence.

According to a yet further exemplary embodiment of the present disclosure, a method for measuring UV exposure is described. The method includes the steps of measuring, by a UV sensor, a UV intensity reading, acquiring, by an inertial measurement unit, movement data of the UV sensor, uploading the UV intensity reading and the movement data to a computer server system, and determining, by the computer server system, a solar incidence angle between a direction of the sun and a normal direction of the UV sensor. Light towards the UV sensor is guided by a light pipe. An end of the light pipe is fitted with and/or covered by a diffuser having an angle-dependent transmission function. The method further includes computing, by the computer server system, an estimation of a maximum UV intensity at normal incidence based on the UV intensity reading, the solar incidence angle, and the angle-dependent transmission function of the diffuser, and determining a UV index based on the estimation of the maximum UV intensity at normal incidence.

Additional features and advantages of the disclosed embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are examples and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

BRIEF DESCRIPTION OF THE DRAWINGS

FIG. 6A is a schematic cross-sectional representation of an example of UV radiation incident on an exemplary UV sensor of the exemplary device of FIG. 1, according to embodiments of the present disclosure.

FIG. 6B is a schematic cross-sectional representation of another example of UV radiation incident on an exemplary UV sensor of the exemplary device of FIG. 1, according to embodiments of the present disclosure.

FIG. 6C is a schematic cross-sectional representation of another example of UV radiation incident on an exemplary UV sensor of the exemplary device of FIG. 1, according to embodiments of the present disclosure.

DETAILED DESCRIPTION

Figure 1:
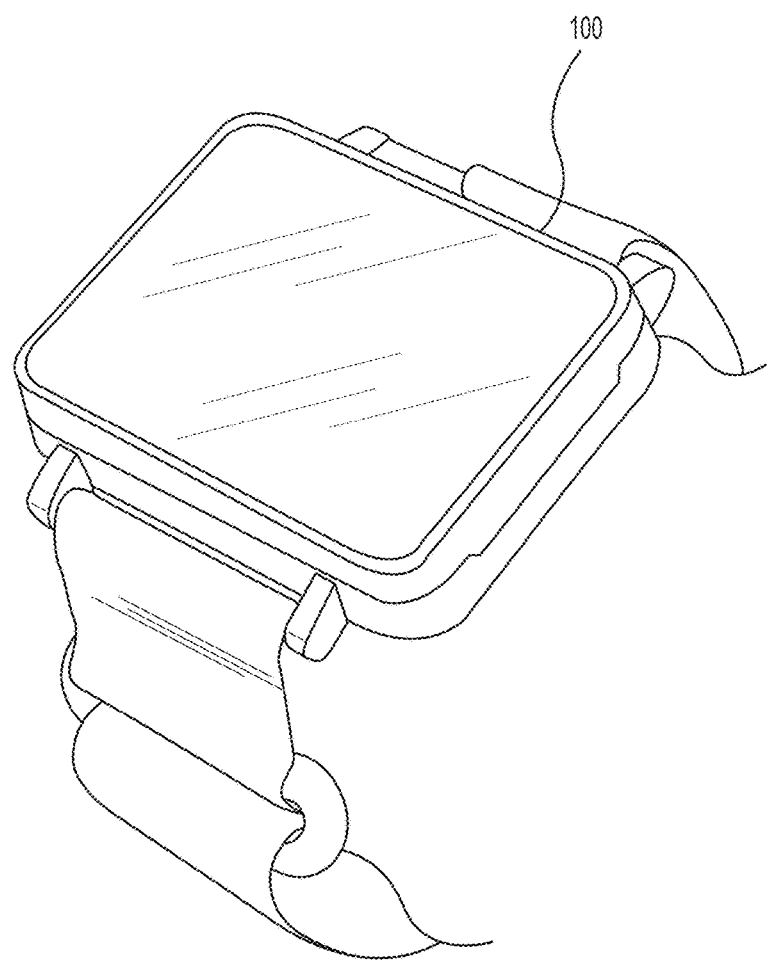
FIG. 1 is a graphical illustration for an exemplary device for measuring UV exposure, according to embodiments of the present disclosure.

The UV index is typically calculated based on the intensity of UV radiation incident on a flat horizontal surface (a horizontal measurement). However, the orientation of a UV sensor of a portable device for determining the UV index may vary due to the movement of the wearer's body. At times, the UV sensor may even be occluded, in the shade, or turned upside down. Such movement of the UV sensor can affect the accuracy of the measurement of the UV intensity and the calculated UV index. Therefore, there is a need to improve the accuracy of measuring UV exposure using portable devices.

The disclosed embodiments relate to systems and methods for measuring UV exposure by determining the UV index using a portable or wearable electronic device under various conditions. Embodiments of the present disclosure can be implemented in a portable or wearable electronic device using one or more orientation sensors. Advantageously, embodiments of the present disclosure determine a local UV index accounting for various factors affecting the measurement of the intensity of UV radiation incident on the surface of a portable UV sensor, providing a more accurate and medically relevant indicator of UV exposure to a user during everyday use.

As described herein, a UV sensor may refer to a camera or a light sensor that responds substantially to one or more wavelengths of UV radiation, or a camera or a light sensor having a filter that substantially transmits one or more wavelengths of UV radiation. The filter may be part of or installed on the camera or light sensor.

The position of the sun in the sky at a particular location varies with both time of day and the geographic coordinate on the earth. Thus, at the particular location, the movement of the sun throughout the day would result in a change of the direction of the sun to an observer or a UV sensor, and thus change the angle of incidence of UV radiation on the UV sensor. Because the UV index is calculated based on the intensity of UV radiation incident on a flat surface in the horizontal plane (a horizontal measurement of UV intensity), the UV index is a function of the direction of the sun or the time of day. Accordingly, if a UV sensor remains flat horizontally, the intensity of UV radiation detected by the UV sensor can be directly used for computing the UV index.

However, when the UV sensor is integrated to a wearable device, determining the UV index based on the intensity of UV radiation detected by the UV sensor can be complicated by the movement of the wearable device while being attached to the wearer. The movement of the device may change the angle of incidence of UV radiation on the UV sensor. For example, the normal direction of the UV sensor (i.e., the z axis of the UV sensor) may move towards or away from the sun, which can increase or decrease the detected intensity of UV radiation. Additionally, the movement of the wearable device may alter the orientation of the UV sensor relative to the horizontal plane, which can further affect the determination of the UV index. As described herein, the orientation of the UV sensor relative to the horizontal plane equals to the zenith angle of the normal direction of the UV sensor.

Advantageously, embodiments of the present disclosure allow for accurate determination of the local UV index by a wearable device by accounting for both the orientation of the UV sensor away from the horizontal plane and the change of the angle of incidence of UV radiation on the UV sensor through the use of at least one orientation sensors. The orientation sensors may detect a zenith angle and/or an azimuth angle of the normal direction of the UV sensor.

According to an aspect of the present disclosure, a device for measuring UV exposure is provided. The device may be a portable device that can be attached to the user at a convenient location. In some embodiments, the device has an integrated electronic sensor chip having various functional components. For example, the sensor chip may have a UV sensor that measures UV intensity. The UV sensor may be a UVA sensor that responds primarily to UVA radiation or a UVB sensor that responds primarily to UVB radiation.

According to an aspect of the present disclosure, the device may have a light pipe that guides light towards the UV sensor. The light pipe may be designed with a suitable dimension that results in a predetermined angular response of the UV sensor. When the normal direction of the UV sensor aligns with the direction of the sun, the response of the UV sensor reaches its maximum. Advantageously, the angular response of the UV sensor allows for the determination of the direction of UV radiation and a maximum UV intensity at normal incidence on the UV sensor. Knowing the direction of UV radiation, the maximum UV intensity at normal incidence can then be used to estimate a horizontal measurement of UV intensity, which in turn can be used to determine the UV index at the particular location and time.

According to an aspect of the present disclosure, the device for measuring UV exposure has an inertial measurement unit integrated to the electronic sensor chip. The inertial measurement unit acquires movement data of the device and/or the UV sensor, such as the acceleration of the UV sensor along the z axis. The acceleration along the z axis can be used to determine the tilt of the UV sensor from the horizontal plane or the zenith angle of the normal direction of the UV sensor. The direction of the sun can be determined based on the time of day and the geographic latitude of the particular location. Based on the zenith angle of the normal direction of the UV sensor and the direction of the sun, an angle between the normal direction of the UV sensor and the direction of UV radiation incident on the UV sensor can be determined. Advantageously, without the need to obtain an angular response of the UV sensor, a maximum UV intensity at normal incidence on the UV sensor can be determined based on the measured UV intensity and the angle between the normal direction of the UV sensor and the direction of UV radiation.

According to an aspect of the present disclosure, the device has a diffuser. The diffuser may be fitted to and/or cover an end of the light pipe. In some embodiments, the diffuser has an angle-dependent transmission function that broadens the angular responsivity of the UV sensor. Advantageously, the use of the diffuser improves the accuracy of the determination of the UV intensity at normal incidence on the UV sensor by allowing for collection of UV light in a wider range of angles. In such instances, the angular response of the UV sensor may have a shape substantially similar to a cosine function. This further improves the accuracy for the determination or estimation of a horizontal measurement of UV intensity, which in turn improves the accuracy of the determination of the local UV index.

As used herein, the direction of the sun in the sky is the direction of UV radiation, and the angle between the normal direction of UV sensor and the direction of the sun or the direction of UV radiation is referred to as the solar incidence angle. Also, as described herein, the horizontal measurement of UV intensity refers to the UV intensity that would have been measured by a UV sensor lying flat on the horizontal plane at the particular time and location, which is used for determining the UV index according to the international standard. Additionally, a zenith angle of the UV sensor refers to the zenith angle of the normal direction of the UV sensor.

According to an aspect of the present disclosure, the device has a compass. The compass may be an electromagnetic sensor module integrated in the electronic sensor chip that provides the azimuth angle of the normal direction of the UV sensor based on measurement of the earth's magnetic field. Advantageously, obtaining the azimuth angle of the UV sensor allows for determination of the angle between the UV sensor and the direction of the sun by accounting for both azimuth and zenith angles, which improves the accuracy for estimating the maximum UV intensity at normal incidence on the UV sensor. This in turn improves the accuracy for the determination of the UV index at the time and location of using the device.

In some embodiments, the electronic sensor chip may further include various circuitries or modules to process the electrical signal indicative of the UV intensity detected by the UV sensor. Such various circuitry or modules may include one or more analogue-to-digital converters (ADC), signal amplification circuitries, signal conditioning and/or processing circuitries, and at least one processor for determining one or more UV intensities and/or the UV index.

According to an aspect of the present disclosure, the wearable device for measuring UV exposure may include a wireless network interface, and may be used in a computer server system. The device may send the movement data measured by the inertial measurement unit and the UV intensity detected by the UV sensor to one or more devices of the computer server system. The computer server system may have wide area network (WAN) connections. The computer server system may determine the UV index using the computer server system and send back the UV index to the wearable device. This computer server system may reduce the computation burden on the device itself, and may also save the power consumption of the device.

According to an aspect of the present disclosure, a method for determining a UV index at a particular location and time is provided. The method may use the above-described device and/or system to measure a plurality of UV intensities at regular intervals, and may determine a UV index at the current time and location. Advantageously, the method may further improve the accuracy of the UV index by accounting for various atmospheric conditions affecting the user's UV exposure, such as sun elevation and distance, stratospheric ozone, cloud conditions, air pollutants, surface albedo, and ground altitude of the location of the user.

Reference will now be made in detail to embodiments and aspects of the present disclosure, examples of which are illustrated in the accompanying drawings. Where possible, the same reference numbers will be used throughout the drawings to refer to the same or like parts.

FIG. 1 graphically illustrates an exemplary device 100 for measuring UV exposure used by methods and systems of the present disclosure. Device 100 may be a portable consumer apparatus that can be attached to or worn by a user while staying, walking, or doing activities outside. For example, as shown in FIG. 1, device 100 may be a wearable band or a watch that can be securely fastened to the user. Device 100 may display or indicate the current UV index. Device 100 may further provide or display other environmental conditions, such as ambient temperature and humidity.

Figure 2:
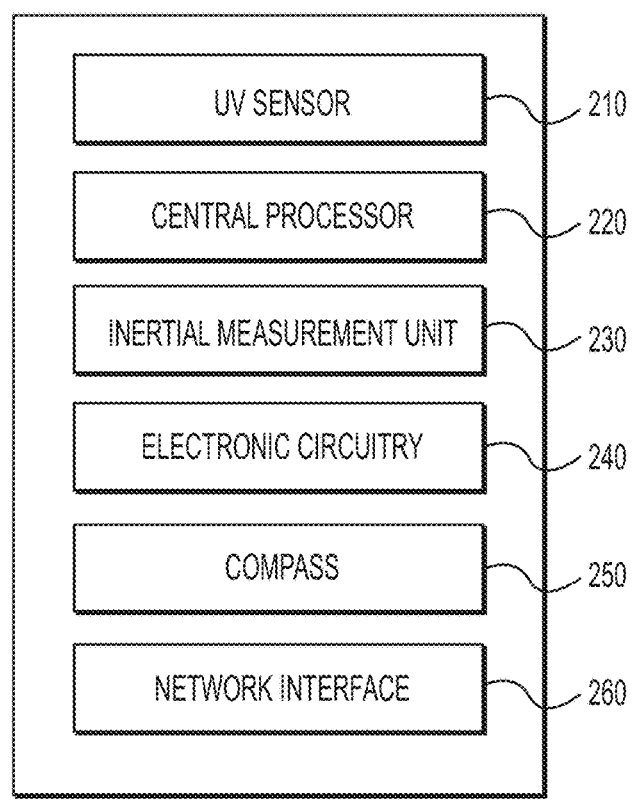
FIG. 2 is a schematic representation of an exemplary electronic sensor chip of the exemplary device of FIG. 1, according to embodiments of the present disclosure.

FIG. 2 is a schematic representation of an exemplary electronic sensor chip 200 of the exemplary device of FIG. 1. As shown in FIG. 2, sensor chip 200 may include a UV sensor 210, a central processor 220, an inertial measurement unit (IMU) 230, and electronic circuitry 240. UV sensor 210 may be a UVA sensor or a UVB sensor. In some embodiments, sensor chip 200 may include both of a UVA sensor and a UVB sensor. UV sensor 210 measures UV intensity by converting detected photon counts into electronic signals, which can be further processed by electronic circuitry 240.

As described herein, a UVA sensor or UVB sensor may refer to a camera or a light sensor that responds substantially to one or more wavelengths of UVA radiation or UVB radiation, or a camera or a light sensor having a filter that substantially transmits one or more wavelengths of UVA radiation or UVB radiation. The filter may be part of or installed on the camera or light sensor. In some embodiments, UV sensor 210 may be a light sensor responding broadly to wide ranges of wavelengths, and the intensity of the desired UV radiation can be extracted from the intensity detected by UV sensor 210.

In some embodiments, the tilt of UV sensor 210 with respect to a horizontal plane may be determined based on the output of IMU 230. For example, IMU 230 can detect the acceleration of sensor chip 200 or UV sensor 210 along the z axis (normal direction of sensor chip 200 or UV sensor 210). Based on the output of IMU 230, device 100 may determine whether UV sensor 210 is facing upward or downward, and may determine the zenith angle of the normal direction of UV sensor 210. IMU 230 may include one or more inertial sensors of the same type or of different types. For example, IMU 230 may include one or more inertial sensors selected from a group including accelerometers, inertial gyroscopes, and MEMS gyroscopes. IMU 230 may be used in combination with or be substituted with other types of sensors, such as a magnetometer, 3D GPS, or other suitable radio frequency-based triangulation sensors. The use of IMU 230 for determining the orientation of UV sensor 210 and determining the UV index is described further below in reference to FIGS. 6A-6C.

In some embodiments, as shown in FIG. 2, sensor chip 200 may include a compass 250 that detects the azimuth angle of UV sensor 210 from the magnetic north. Compass 250 may also determine the azimuth angle of UV sensor 210 from the true north based on the angle between true north and magnetic north of the particular location. Compass 250 may be an electromagnetic sensor module integrated in sensor chip 200. Obtaining the azimuth angle of UV sensor 210 allows for direct determination of the angle between the UV sensor 210 and the direction of the sun, which can improve the accuracy for determining the maximum UV intensity at normal incidence on UV sensor 210. The use of compass 250 for determining the maximum UV intensity at normal incidence and the UV index is described further below in reference to FIGS. 6A-6C.

In some embodiments, electronic circuitry 240 receives electrical signals from UV sensor 210, IMU 230, and/or compass 250. Electronic circuitry 240 may transmit the received electrical signals to central processor 220 for determining or estimating a horizontal measurement of UV intensity. Central processor 220 may further determine the UV index based on the determined horizontal measurement of UV intensity. In some embodiments, electronic circuitry 240 may further include one or more various circuitries or modules to process the electrical signals detected by UV sensor 210, IMU 230, and/or compass 250. Such various circuitry or modules may include one or more analogue-to-digital converters (ADC), signal amplification circuitries, signal conditioning and/or processing circuitries.

In some embodiments, sensor chip 200 may include a network interface 260. Network interface 260 may be a wireless network interface, such as a Bluetooth module (BT module) or a radio frequency module (RF module) (e.g., Wi-Fi 2.4 GHz module). Network interface 260 may upload the measurement data of UV sensor 210, IMU 230, and/or compass 250 to a computer server system, such as a computer server system having WAN connections. One or more computing devices of the computer server system may be recruited to determine the UV index based on the uploaded measurement data. This may further save the power consumption of device 100. Additionally or alternatively, device 100 may upload the measurement data via network interface 260 to a mobile computing device, such as a smartphone. The mobile computing device may be used to determine the UV index based on the uploaded measurement data. In some embodiments, the mobile computing device may also display the determined UV index to the user.

Figure 3:
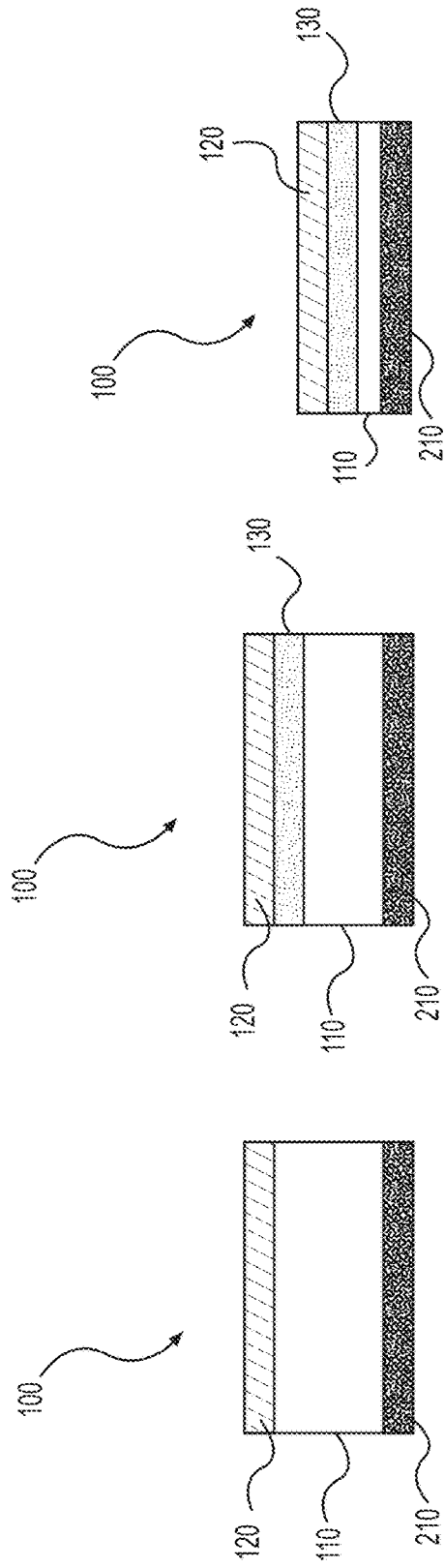
FIG. 3A is a graphical cross-sectional illustration of an exemplary of the exemplary device of FIG. 1, according to embodiments of the present disclosure.
FIG. 3B is a graphical cross-sectional illustration of another example of the exemplary device of FIG. 1, according to embodiments of the present disclosure.
FIG. 3C is a graphical cross-sectional illustration of another example of the exemplary device of FIG. 1, according to embodiments of the present disclosure.

FIGS. 3A-3C are graphical cross-sectional illustrations of different embodiments of device 100. In one embodiment, as shown in FIG. 3A, device 100 may include a light pipe 110. Light pipe 110 is an optical structure that guides light towards UV sensor 210 (e.g., extending along an axis substantially parallel to the normal direction of the UV sensor 210). In some embodiments, light pipe 110 is a hollow structure that surrounds sensor chip 200 and/or UV sensor 210. In other embodiments, light pipe 110 is a solid structure that covers or is installed upon sensor chip 200 and/or UV sensor 210. Light pipe 110 may operate as a waveguide that transmits and/or internally reflects light entering an end of light pipe 110 towards UV sensor 210. Device 100 may also include a cover 120. Cover 120 may be made of a transparent material that does not substantially adsorb UV radiation, such as glass. Light pipe 110 may be made with one or more nontransparent plastic materials and designed with a predetermined height and diameter. The dimensions of light pipe 110 may be determined to obtain an angular response of UV sensor 210. For example, the intensity of UV radiation detected by UV sensor 210 depends on the angle of UV radiation entering light pipe 110. If UV radiation enters light pipe 110 at normal incidence, UV sensor 210 detects a maximum UV intensity. Higher angles of UV radiation would lead to less amount of UV radiation reaching UV sensor 210 in light pipe 110, resulting in smaller values of UV intensity detected by UV sensor 210. Advantageously, the angular response of UV sensor 210 resulted from using light pipe 110 allows for the determination of the direction of UV radiation, which is the angle at which a maximum UV intensity at normal incidence can be obtained. The direction of UV radiation and the maximum UV intensity at normal incidence on UV sensor 210 can be used to determine or estimate a horizontal measurement of UV intensity.

Additionally or alternatively, the angular response of UV sensor 210 may be obtained by using a diffuser 130 for collecting UV radiation towards UV sensor 210. As shown in FIG. 3B, diffuser 130 may be fitted to and/or cover an end of light pipe 110 from which light enters light pipe 110. Diffuser 130 may have an angle-dependent transmission function that characterizes the angle-dependent transmission property of the diffuser. The angle-dependent transmission function may have a shape substantially close to a cosine function. In some embodiments, diffuser 130 may be made of a polymer material, such as a Spectralon®, polycaprolactone, or Zenith Polymer®.

Figure 4:
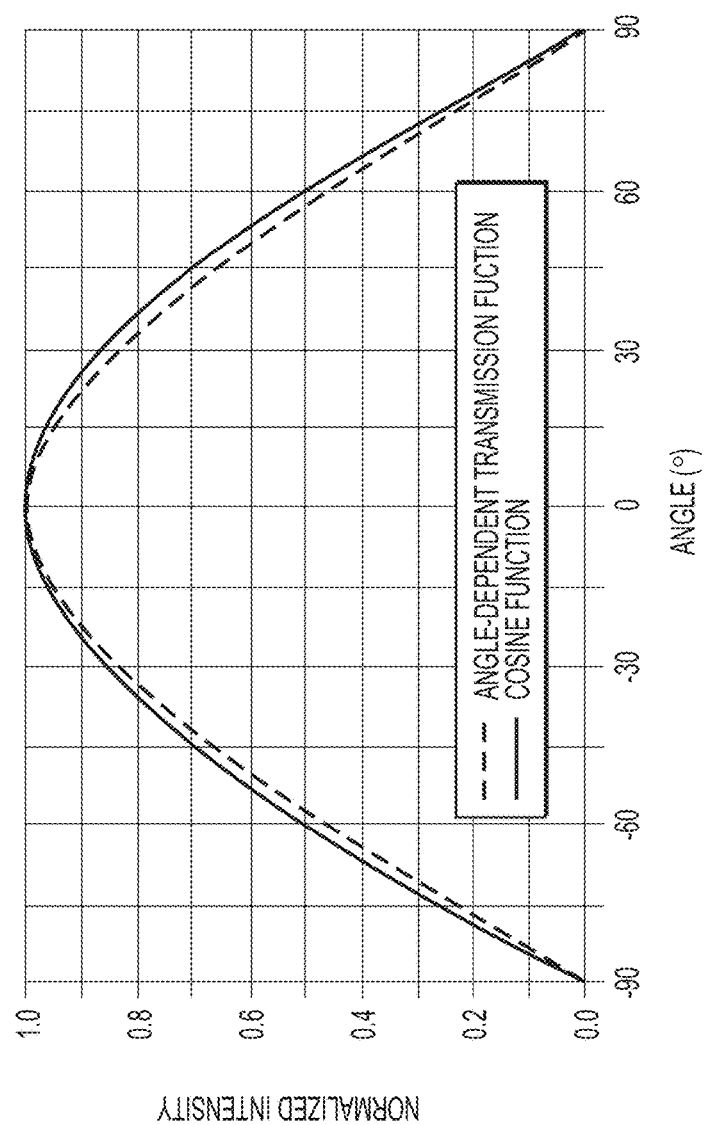
FIG. 4 is a diagram of the angle-dependent transmission function of an exemplary diffuser of the exemplary device of FIG. 1, according to embodiments of the present disclosure.

FIG. 4 compares the angle-dependent transmission function of an exemplary diffuser 130 to that of a cosine function. As shown in FIG. 4, the normalized intensity transmitted through diffuser 130 is plotted against the angle of UV radiation with respect to the normal direction of UV sensor 210, with the maximum intensity at normal incidence. The angle-dependent transmission function of diffuser 130 allows the collection and detection of UV radiation from a wide range of angles, ranging from 0° up to 90°. Advantageously, the wide angular response provided by diffuser 130 allows the detection of higher amount of UV radiation when the orientation of device 100 changes as the user moves or performs activities, thereby further increasing the accuracy and/or sensitivity of device 100.

In some embodiments, to further improve the range of angular response of UV sensor 210 and/or the amount of UV radiation detected by UV sensor 210, as shown in FIG. 3C, the height of light pipe 110 may be reduced. This moves UV sensor 210 closer to cover 120 and may make the curve of the angular response of UV sensor resembles closer to a cosine function. In other embodiments, UV sensor 210 may be directly placed below cover 120.

Figures 5A, 5B:
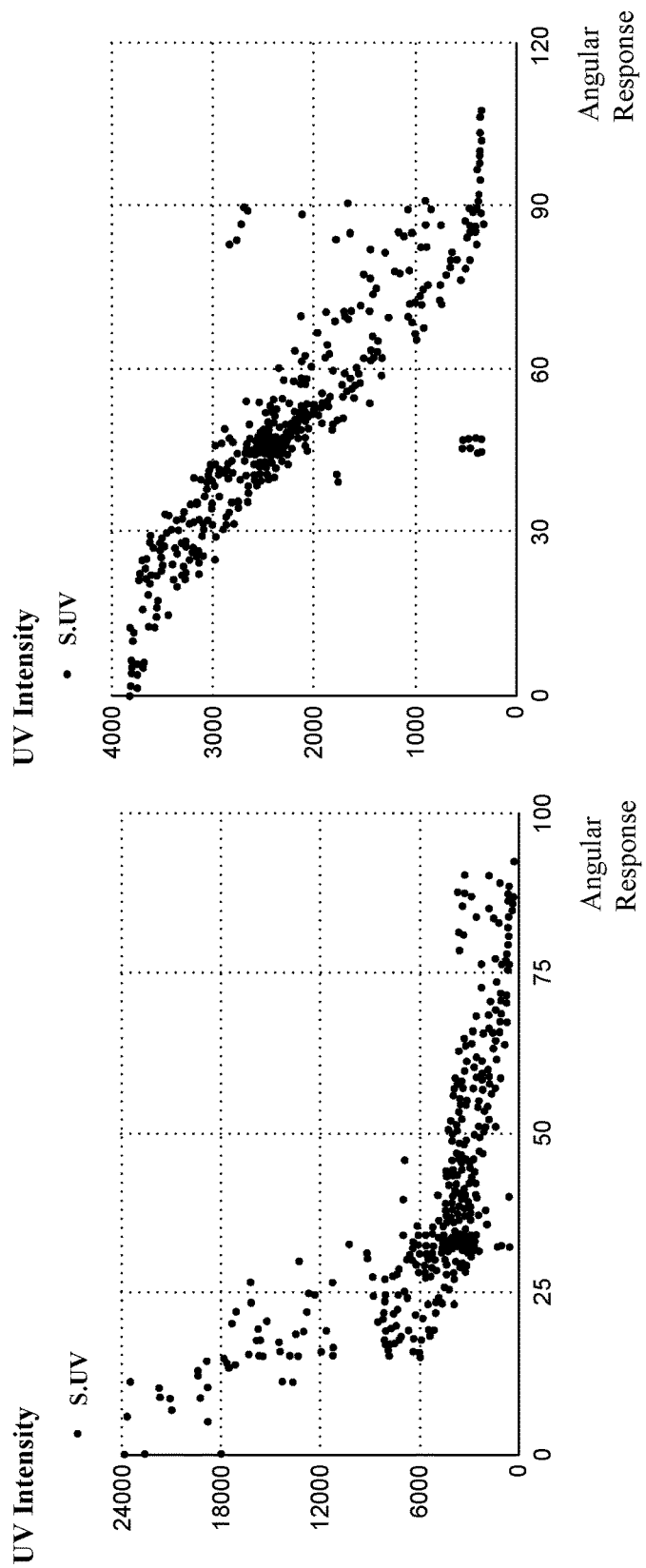
FIG. 5A is a diagram of a plurality of measurements of UV intensity by an embodiment the exemplary device of FIG. 1, according to embodiments of the present disclosure.
FIG. 5B is a diagram of a plurality of measurements of UV intensity by another embodiment the exemplary device of FIG. 1, according to embodiments of the present disclosure.

FIG. 5A is a diagram of a plurality of measurements of UV intensity by UV sensor 210 of an exemplary device 100 without diffuser 130, while FIG. 5B is a diagram of a plurality of measurements of UV intensity by UV sensor 210 of another exemplary device 100 with diffuser 130. The results show an angular response of UV sensor 210 to UV radiation entering light pipe 110 at different angles. As shown in FIG. 5A, the UV intensity detected by UV sensor 210 of device 100 without diffuser 130 attenuated linearly as the angle of UV radiation increases to a threshold angle, at which the detected UV intensity substantially attenuated to minimal. In contract, as shown in FIG. 5B, the UV intensity detected by UV sensor 210 of device 100 with diffuser 130 attenuated in accordance with a cosine function. The intensity of UV radiation is still detectable at high angles of UV radiation up to 90°. Comparing the results shown in FIGS. 5A and 5B, the angular response of UV sensor 210 of device 100 is narrower when device 100 does not have diffuser 130. Therefore, the use of diffuser 130 advantageously broadens the angular response of device 100 and improves the sensitivity and accuracy of device 100 for measuring intensity of UV radiation.

The determination of UV index by device 100 based on the intensity of UV radiation detected by UV sensor 210 is described below in reference to FIGS. 6A-6C.

FIGS. 6A-6C are schematic cross-sectional representations of UV radiation incident on UV sensor 210 of device 100 in different instances. As shown in FIG. 6A, when UV sensor 210 tilts at an angle $\theta_{sensor}$ from the horizontal plane (zenith angle of UV sensor 210), and when the direction of UV radiation is perpendicular to the horizontal plane (i.e., the solar zenith angle $\theta_{sun}=0°$), the normal direction of UV sensor 210 is at an angle $\theta_{sensor}$ to the direction of UV radiation. Therefore, the UV intensity detected by UV sensor 210, $I_{sensor}$, equals to $I_{horiz} \cos \theta_{sensor}$. In this instance, a horizontal measurement of UV intensity can be determined or estimated as $I_{horiz}=I_{sensor}/\cos \theta_{sensor}$. $\theta_{sensor}$ can be determined by device 100 based on the z axis acceleration detected by IMU 230. $I_{horiz}$ then can be used to determine the UV index based on the standard McKinlay-Diffey Erythemal Action Spectrum. As the position of the sun in the sky changes, the angle between UV sensor 210 and the direction of the sun or the direction of UV radiation changes. As shown in FIG. 6B, when the direction of UV radiation aligns with the normal direction of UV sensor 210, i.e., when $\theta_{sensor}=\theta_{sun}$, the intensity of UV radiation detected by UV sensor 210, $I_{sensor}$, equals to a maximum intensity at normal incidence, i.e., $I_{max}=I_{sensor}$. The horizontal measurement of UV intensity can be determined as $I_{horiz}=I_{max} \cos\_d(\theta_{sun})= I_{sensor} \cos\_d(\theta_{sun})$, where cos_d is the diffuser's angle-dependent transmission function. In this instance, the direction of the sun, $\theta_{sun}$, equals to that of the normal direction of UV sensor. Thus, $\theta_{sun}$ can be determined by device 100 based on the z axis acceleration detected by IMU 230.

As described herein, the UV intensity detected by UV sensor 210, $I_{sensor}$, may refer to a UV intensity reading by UV sensor 210. A maximum intensity at normal incidence, $I_{max}$, may refer to an estimation of a maximum UV intensity at normal incidence on the UV sensor.

When the sun moves further away from the zenith, as shown in FIG. 6C, the direction of UV radiation moves further away from the normal direction of UV sensor 210. Thus, the intensity of UV radiation detected by UV sensor 210 is smaller than that at normal incidence. In this instance, a maximum intensity at normal incidence, $I_{max}$, can be obtained from the UV intensity detected by UV sensor 210 as $I_{max}=I_{sensor}/\cos\_d(\theta_{sun}-\theta_{sensor})$. After determining the maximum intensity at normal incidence, the horizontal measurement of UV intensity can be similarly determined as that shown in FIG. 6B, that is $I_{horiz}=I_{max} \cos\_d(\theta_{sun})=I_{sensor} \cos\_d(\theta_{sun})/\cos\_d(\theta_{sun}-\theta_{sensor})$. The orientation of the UV sensor, $\theta_{sensor}$, can be determined by device 100 based on the z axis acceleration detected by IMU 230. The direction of the sun, $\theta_{sun}$, can be determined based on the time of day and the geographic latitude of the particular location of the user. $I_{horiz}$ then can be used to determine the UV index based on the standard McKinlay-Diffey Erythemal Action Spectrum.

As described herein, the current time of day can be obtained by an on-chip clock module integrated to the sensor chip 200. Additionally, the current geographic latitude or location may be obtained by an on-chip GPS module, from a mobile device, and/or from a manual entry by the user.

The UV intensity detected by UV sensor 210, $I_{sensor}$, can attenuate substantially when the user wearing device 100 temporarily blocks device 100 from sun light, or when the user enters a shaded or dark area. In some embodiments, device 100 may acquire a plurality of UV intensity values at a sampling rate over a period of time. The substantially attenuated UV intensity values acquired during this period of time are excluded from being used to obtain the UV index, thereby improving the accuracy of the obtained UV index. Additionally or alternatively, device 100 may interpolate intermediate intensity values between the sampled plurality of UV intensity values. Device 100 may integrate the intermediate intensity values and the sampled plurality of UV intensity values over a period of time to acquire the UV intensity reading, $I_{sensor}$.

In some embodiments, reducing the time interval between two UV intensity measurements to be shorter than a period of movement of device 100 or the user may allow for a more accurate temporal detection of UV intensity values. This may be achieved by increasing the sampling rate of device 100. In some embodiments, the sampling rate of device 100 may range from about 0.5 Hz to 10 Hz.

In some embodiments, the integration time of UV sensor 210 for detecting the UV intensity may be increased to reduce temporal noise or may be decreased to prevent saturation. In some embodiments, device 100 may accumulate the determined UV index over a period time, e.g., from about 50 milliseconds to about 500 milliseconds, and determine a time-accumulated index as the final exposure value in units of index-hours.

In some embodiments, the azimuth angle of UV sensor 210 from the magnetic north and/or true north detected by compass 250 is used for determining the maximum UV intensity at normal incidence on UV sensor 210. The solar azimuth angle and/or the azimuth angle of the sun can be obtained based on the time of day and location. In such instances, device 100 may obtain a more accurate determination of the angle between the normal direction of UV sensor 210 and the direction of the sun, by accounting for the azimuth angle between the direction of the sun and the normal direction of UV sensor 210 as well as the zenith angles of the sun and UV sensor 210. This would further lead to a more accurate determination the horizontal measurement of UV intensity, and thus a more accurate value of the UV index.

In some embodiments, UV sensor 210 of device 100 may be a UVA sensor. Because of the stronger harmful effect of UVB radiation, the standard McKinlay-Diffey Erythemal Action Spectrum weighs the intensity of UVB radiation about 100 times more than that of UVA radiation. Therefore, when UV sensor 210 is a UVA sensor, the intensity of UVB radiation needs to be extrapolated to determine the UV index. The intensity of UVB radiation may be obtained based on the detected intensity of UVA radiation and the UVB:UVA ratio.

The UVB:UVA ratio is a function of multiple parameters, including the time of day. The air mass in the earth's atmosphere filters UVB radiation more strongly than UVA radiation as they pass through, with the ozone as the strongest filter of UVB radiation. The intensity of UVA or UVB radiation is generally attenuated exponentially proportional to the relative air mass, multiplied by a scaling factor. The scaling factor may be represented by a function whose value changes based on one or more parameters. For example, the scaling factor may be a function of wavelength, Rayleigh scattering, atmospheric turbidity, and ozone layer density. The attenuated intensity can be represented as $$I_{attenuated} = Ie^{-(Rayleigh(\lambda) + aerosol(\lambda) + ozone(\lambda))m},$$

where $\lambda$ is the wavelength and m is the relative air mass. In some instances, typical values under similar atmosphere conditions may be used in the equation. Thus, the UVB: UVA ratio can be obtained by dividing the value of $I_{attenuated}$ of UVB radiation by that of UVA radiation. The intensity of UVB radiation can then be obtained using the determined UVB:UVA ratio and the intensity of UVA radiation detected by UV sensor 210. The intensity of UVB radiation can in turn be used to determine the UV index.

In some embodiments, UV sensor 210 of device 100 may be a UVB sensor that directly measures the intensity of UVB radiation. In other embodiments, device 100 may have two UV sensors 210, one UVA sensor and one UVB sensor. The direct detection of the intensity of UVB radiation or the detection of the intensities of UVA radiation and UVB radiation using separate sensors reduces the need to extrapolate intensities of UVB radiation, and thus may advantageously result in more accurate determination of the UV index.

FIGS. 7A-7D are box plots of the errors of a plurality of simulated measurements of the UV index at different angles of the sun of four different embodiments of device 100. The y axis corresponds to the UV index while the x axis corresponds to the angle of the sun or the direction of UV radiation in steps of 10°. Each box shows the distribution of errors between the UV index values determined in a simulated measurement using device 100 and the true UV index values in 30 simulated different atmospheric conditions. The sampling rate used in the simulated measurements is 2 Hz.

Figure 7A:
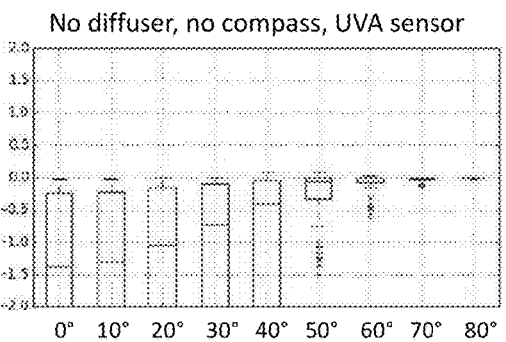
FIG. 7A is a boxplot of the errors of a plurality of simulated measurements of the UV index by one embodiment of the exemplary device of FIG. 1 without a diffuser or compass, according to embodiments of the present disclosure.
Figure 7B:
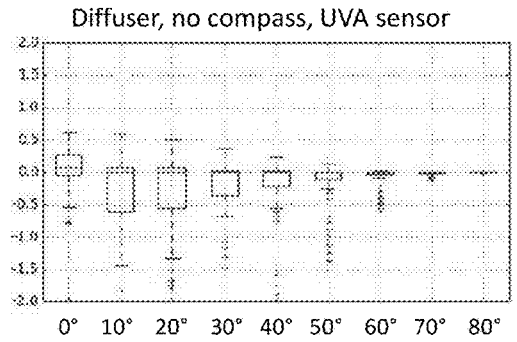
FIG. 7B is another boxplot of the errors of a plurality of simulated measurements of the UV index by another embodiment of the exemplary device of FIG. 1, according to embodiments of the present disclosure.

FIG. 7A shows a box plot of the errors of 30 simulated measurements of the UV index at different angles of the sun, ranging from 10° to 80°, using one embodiment device 100. In this instance, device 100 has a UVA sensor as UV sensor 210, but does not have diffuser 130 or compass 250. As shown in FIG. 7A, when the sun is at the zenith (angle of the sun equals to 0°), the median error of the UV index value determined by the simulated measurement using device 100 is about 1.4. The median error decreases as the angle of the sun increases. FIG. 7B shows a box plot of the errors of 30 simulated measurements of the UV index at different angles of the sun, ranging from 10° to 80°, using another embodiment of device 100. In this instance, device 100 uses diffuser 130 and a UVA sensor as UV sensor 210, but does not have compass 250. Comparing to the results shown in FIG. 7A, the median errors of the UV index values determined by the simulated measurements are less than 0.5 at all the angles of the sun. This shows that the use of diffuser 130 and its broad angular response improves the accuracy of determining the UV index by device 100.

Figure 7C:
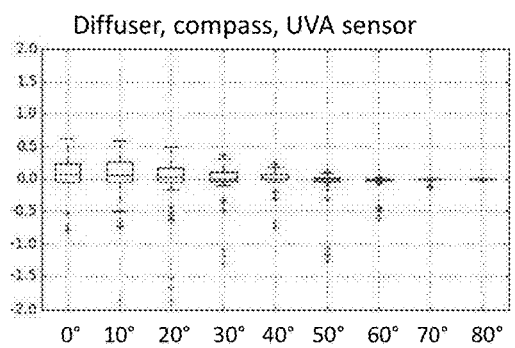
FIG. 7C is another boxplot of the errors of a plurality of simulated measurements of the UV index by another embodiment of the exemplary device of FIG. 1, according to embodiments of the present disclosure.

FIG. 7C shows a box plot of the errors of 30 simulated measurements of the UV index at different angles of the sun, ranging from 10° to 80°, using another embodiment of device 100. In this instance, device 100 has diffuser 130 and compass 250, and uses a UVA sensor as UV sensor 210. The results shown in the box plot of FIG. 7C is also corrected for manufacturing variation. As shown in FIG. 7C, the median errors of the UV index values determined by the simulated measurements are less than 0.1 at all the angles of the sun. Additionally, the interquartile ranges (IQR) of the box plot shown in FIG. 7C, which indicates the level of dispersion, is less than 0.3. This is substantially smaller than the box plot shown in FIG. 7B at lower angles of the sun, e.g., at angles ranging from 0° to 50°. This shows that the use of compass 250 allows device 100 to determine the angle between UV sensor 210 and the direction of UV radiation more accurately, thereby advantageously improving the accuracy and reducing the variability of the UV index determined by device 100.

Figure 7D:
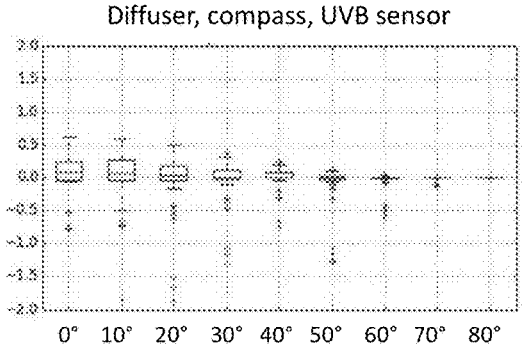
FIG. 7D is another boxplot of the errors of a plurality of simulated measurements of the UV index by another embodiment of the exemplary device of FIG. 1, according to embodiments of the present disclosure.

FIG. 7D shows a box plot of the errors of 30 simulated measurements of the UV index at different angles of the sun, ranging from 10° to 80°, of another embodiment of device 100. In this instance, device 100 has diffuser 130 and compass 250, and uses a UVB sensor as UV sensor 210. As shown in FIG. 7D, the median errors of the UV index values determined by the simulated measurements are three time less than those shown in FIG. 7C at most of the angles of the sun. Additionally, the IQRs of the box plot shown in FIG. 7D is less than 0.1 at most of angles of the sun. The IQRs are smaller than those of the box plot shown in FIG. 7B, suggesting that the use of UVB sensor by device 100 reduces the variably of the UV index determined by device 100.

Figure 8:
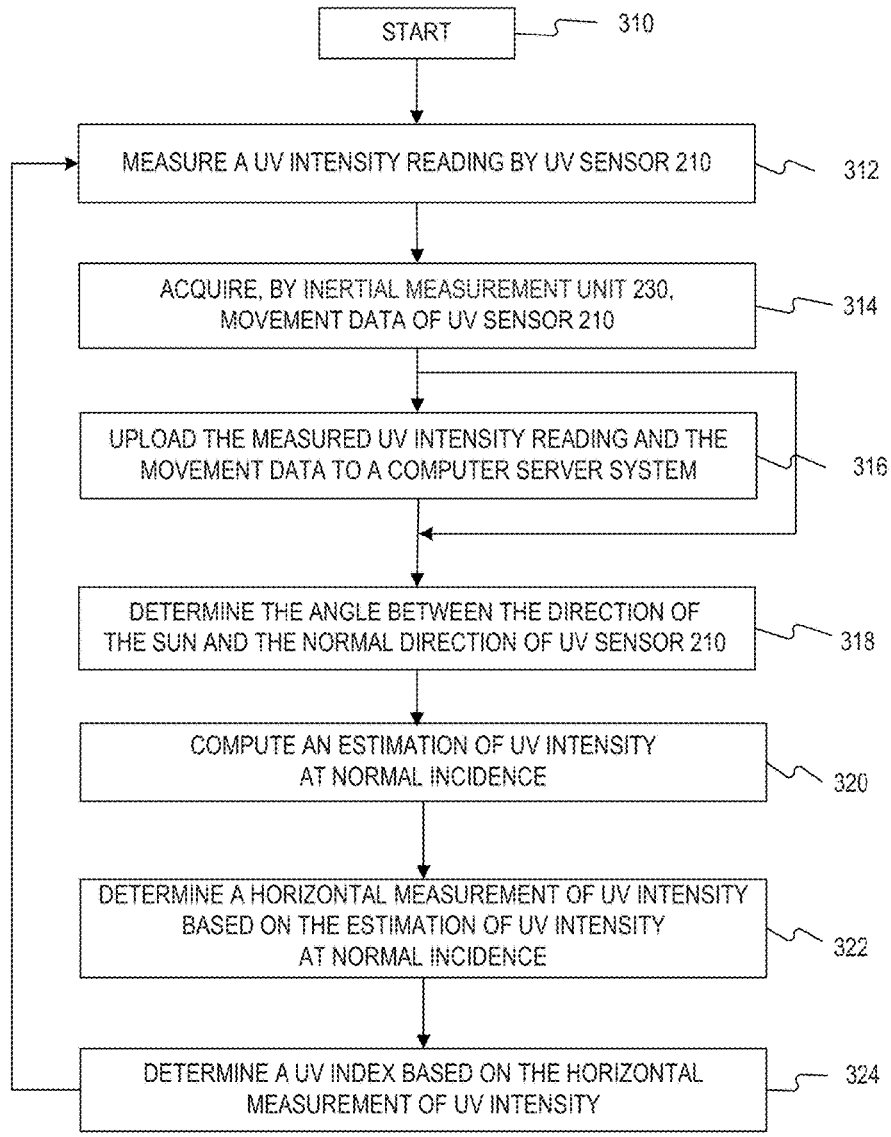
FIG. 8 is a flowchart of an exemplary method for measuring UV exposure, according to embodiments of the present disclosure.

Device 100 described herein may be utilized in a variety of systems and methods for measuring UV exposure. FIG. 8 is a flowchart of an exemplary method 300 for measuring UV exposure. Method 300 uses device 100 and one or more features of the embodiments of device 100 described above in reference to FIGS. 1-7. In some embodiments, method 300 may be performed by device 100. In other embodiments, method 300 may be performed by a system including device 100, such as a computer server system.

As shown in FIG. 8, in step 312, UV sensor 210 may measure a UV intensity reading. For example, UV sensor 210 may detect UV radiation entering light pipe 110 through diffuser 130 and generate an electrical signal indicating the intensity of the UV radiation incident on UV sensor 210. In step 314, IMU 230 may acquire movement data of UV sensor 210. For example, IMU 230 may be an accelerometer that acquires the z axis acceleration of UV sensor 210, which may then be used to determine a zenith angle of the normal direction of UV sensor 210. Optionally, method 300 includes step 316. In step 316, the measured UV intensity reading and the movement data of UV sensor 210 may be uploaded to a computer server system with WAN connections, and the computer server system may use the received data to determine a UV index and send back the value of the determined UV index to device 100 or a mobile computing device.

Figure 9:
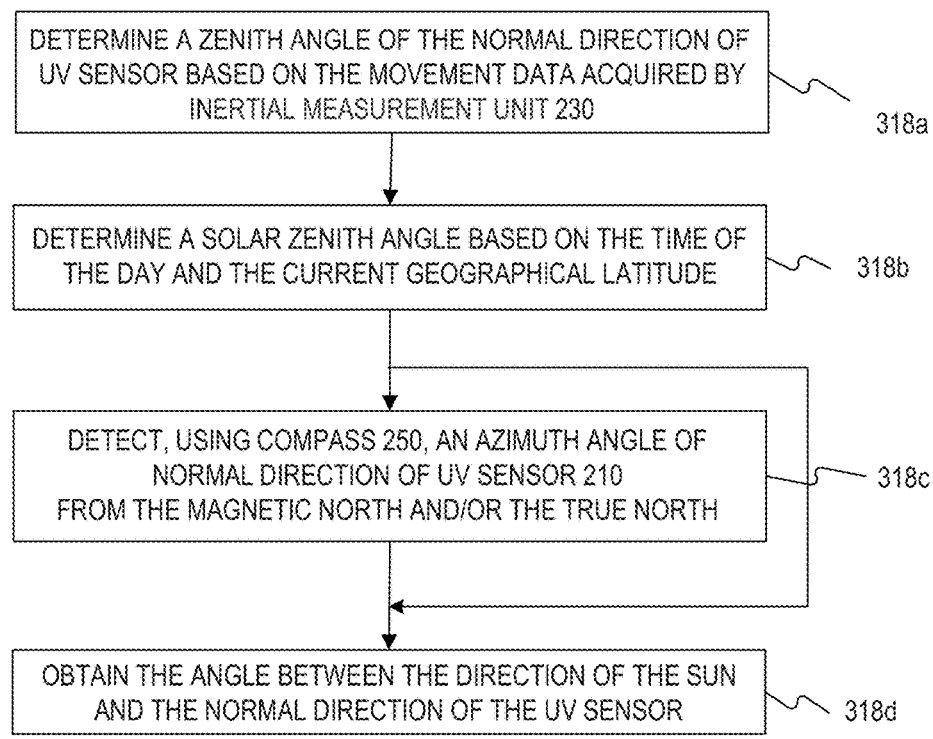
FIG. 9 is a flowchart of an exemplary approach for determining the angle between the UV sensor and the direction of the sun, according to embodiments of the present disclosure.

In step 318, an angle between the direction of sun and the normal direction of UV sensor 210 can be determined using one or more approaches. For example, as shown in FIG. 9, step 318 may include steps 318a, 318b, 318c, and 318d. First, in step 318a, a zenith angle of UV sensor 210 may be determined based on the movement data acquired by IMU 230. Second, in step 318b, a solar zenith angle may be determined based on the current time of day and the current geographic latitude of UV sensor 210. Optionally, in step 318c, an azimuth angle of the UV sensor 210 from the magnetic north and/or the true north may be determined by compass 250. The solar azimuth angle can be obtained based on the time of day and location. In step 318d, the true angle between UV sensor 210 and the direction of the sun can be ascertained by accounting for the previously determined zenith and azimuth angles of UV sensor 210 and the solar zenith and azimuth angles. In other embodiments, step 318c may be omitted, and in step 318d, the angle between the direction of the sun and the normal direction of the UV sensor can be estimated based on the solar zenith angle and the zenith angle of the normal direction of UV sensor 210.

In step 320, central processor 220 of device 100 or a server of a computer server system may compute an estimation of a maximum UV intensity at normal incidence on UV sensor 210 based on the UV intensity reading acquired in step 312. For example, the maximum UV intensity may be obtained based on the measured UV intensity reading in step 312 and the angle between the direction of the sun and the normal direction of UV sensor 210 determined in step 318. In some embodiments, the angle-dependent transmission function of diffuser 130 is also used for obtaining the maximum UV intensity at normal incidence.

In step 322, the maximum UV intensity obtained in step 320 is used to determine a horizontal measurement of UV intensity. In step 324, a UV index value can be obtained based on the horizontal measurement of UV intensity. In some embodiments, if UV sensor 210 is a UVA sensor, step 324 may include converting the UV intensity of UVA radiation to that of UVB radiation, and then use the determined intensity of UVA radiation and/or the intensity of UVB radiation to obtain the UV index.

Steps 312-324 may be performed iteratively at regular intervals for a period of time. For example, steps 312-324 may be repeated at a sampling rate ranging from about 0.5 Hz to 10 Hz over a period of time. Outliers of the obtained UV index caused by occluding UV sensor 210 may be excluded during the period of time. The obtained values of the UV index may be added to provide an accumulated UV index to indicate the total amount of UV exposure over the particular period of time. Alternatively, the obtained values of the UV index may be averaged to provide a mean UV index of the particular period of time.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps may be stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for measuring ultraviolet (UV) exposure, comprising:
   an electronic sensor chip, the electronic sensor chip comprising
   a UV sensor that measures a UV intensity reading;
   an inertial measurement unit that acquires movement data of the UV sensor; and
   at least one processor;
   a light pipe that guides light towards the UV sensor; and
   a diffuser covering an end of the light pipe, the diffuser having an angle-dependent transmission function;
   wherein the at least one processor performs operations comprising:
      determining a solar incidence angle between a direction of the sun and a normal direction of the UV sensor;
      computing an estimation of a maximum UV intensity at normal incidence based on the UV intensity reading, the solar incidence angle, and an angular response curve of the diffuser; and
      outputting a UV index based on the estimation of the maximum UV intensity at normal incidence.

2. The system of claim 1, wherein the operations further comprising:
   computing an estimation of a horizontal measurement of UV intensity based on the estimation of the maximum UV intensity at normal incidence and a solar zenith angle; and
   determining the UV index based on the estimation of the horizontal measurement of UV intensity.

3. The system of claim 2, wherein the solar zenith angle is determined by
   determining an angular response of the UV sensor by measuring a plurality of UV intensity values at a series of orientations of the UV sensor; and
   assigning, by the at least one processor, the orientation at which the UV intensity value among the plurality of UV intensity values is highest as the solar zenith angle.

4. The system of claim 2, further comprising an on-chip clock module that determines the current time of day and an on-chip or a mobile GPS module that determines the current geographic latitude of the UV sensor, wherein the solar zenith angle is determined based on the current time of day and the current geographic latitude of the UV sensor.

5. The system of claim 2, wherein the solar incidence angle is determined by:
   determining, by the at least one processor, a zenith angle of the UV sensor based on the movement data acquired by the inertial measurement unit; and
   assigning, by the at least one processor, difference between the solar zenith angle and the zenith angle of the UV sensor as the solar incidence angle.

6. The system of claim 2, further comprising a compass that detects an azimuth angle of the normal direction of the UV sensor from the magnetic north and/or the true north,
   wherein the solar incidence angle is determined, by the at least one processor, based on the azimuth angle, the current time of day, and the current geographic latitude of the UV sensor.

7. The system of claim 2, wherein the UV sensor is a UVA sensor and the operations further comprising
   computing an intensity of UVB radiation based on the estimation of the horizontal measurement of UV intensity and a scaling factor as a function of one or more parameters; and
   determining the UV index using the intensity of UVB radiation.

8. The system of claim 2, wherein the UV sensor is an UVB sensor.

9. The system of claim 1, wherein the UV sensor samples a plurality of UV intensity values at a sampling rate from about 0.5 Hz to about 10 Hz.

10. The system of claim 9, wherein the operations further comprising
    interpolating intermediate intensity values between the sampled plurality of UV intensity values; and
    integrating the intermediate intensity values and the sampled plurality of UV intensity values over a period of time to acquire the UV intensity reading.

11. The system of claim 1, wherein
    the electronic sensor chip further comprises a wireless network interface to upload the UV intensity reading and the movement data to a computer server system; and
    the at least one processor is part of the computer server system.

12. A method for measuring ultraviolet (UV) exposure, comprising:
    measuring, by a UV sensor, a UV intensity reading, wherein light is guided by a light pipe towards the UV sensor, and an end of the light pipe is covered with a diffuser having an angle-dependent transmission function;
    acquiring, by an inertial measurement unit, movement data of the UV sensor;
    determining a solar incidence angle between a direction of the sun and a normal direction of the UV sensor;
    computing an estimation of a maximum UV intensity at normal incidence based on the UV intensity reading, the solar incidence angle, and the angle-dependent transmission function of the diffuser; and
    outputting a UV index based on the estimation of the maximum UV intensity at normal incidence.

13. The method of claim 12, further comprising
    estimating an estimation of a horizontal measurement of UV intensity based on the estimation of the maximum UV intensity at normal incidence and a solar zenith angle; and
    determining the UV index based on the estimation of the horizontal measurement of UV intensity.

14. The method of claim 13, further comprising determining the solar zenith angle by
    determining an angular response of the UV sensor by measuring a plurality of UV intensity values at a series of orientations of the UV sensor; and
    assigning the orientation at which the UV intensity value among the plurality of UV intensity values is highest as the solar zenith angle.

15. The method of claim 13, further comprising determining the solar zenith angle based on the current time of day and the current geographic latitude of the UV sensor.

16. The method of claim 13, further comprising determining the solar incidence angle by
- determining a zenith angle of the UV sensor based on the movement data acquired by the inertial measurement unit; and
- assigning difference between the solar zenith angle and the zenith angle of the UV sensor as the solar incidence angle.

17. The method of claim 13, further comprising
- detecting, using a compass, an azimuth angle of the normal direction of the UV sensor from the magnetic north and/or the true north; and
- determining the solar incidence angle based on the azimuth angle, the current time of day, and the current geographic latitude of the UV sensor.

18. The method of claim 13, wherein the UV sensor is a UVA sensor and the method further comprising
- computing an intensity of UVB radiation based on the estimation of the horizontal measurement of UV intensity and a scaling factor as a function of one or more parameters; and
- determining the UV index using the intensity of UVB radiation.

19. The method of claim 13, wherein the UV sensor is an UVB sensor.

20. The method of claim 12, further comprising sampling a plurality of UV intensity values at a sampling rate from about 0.5 Hz to about 10 Hz.

21. The method of claim 20, further comprising
- interpolating intermediate intensity values between the sampled plurality of UV intensity values; and
- integrating the intermediate intensity values and the sampled plurality of UV intensity values over a period of time to acquire the UV intensity reading.

22. The method of claim 12, further comprising uploading the UV intensity reading measured by the UV sensor and the movement data to a computer server system.

23. A method for measuring ultraviolet (UV) exposure, comprising:
- measuring, by a UV sensor, a UV intensity reading, wherein light is guided by a light pipe towards the UV sensor, and an end of the light pipe is covered with a diffuser having an angle-dependent transmission function;
- acquiring, by an inertial measurement unit, movement data of the UV sensor;
- uploading the UV intensity reading and the movement data to a computer server system;
- determining, by the computer server system, a solar incidence angle between a direction of the sun and a normal direction of the UV sensor;
- computing, by the computer server system, an estimation of a maximum UV intensity at normal incidence based on the UV intensity reading, the solar incidence angle, and the angle-dependent transmission function of the diffuser; and
- determining, by the computer server system, a UV index based on the estimation of the maximum UV intensity at normal incidence.

24. A system for measuring ultraviolet (UV) exposure, comprising:
- an electronic sensor chip, the electronic sensor chip comprising
  - a UV sensor that measures a UV intensity reading;
  - an inertial measurement unit that acquires movement data of the UV sensor; and
  - at least one processor;
- a light pipe that guides light towards the UV sensor; and
- a diffuser covering an end of the light pipe, the diffuser having an angle-dependent transmission function.

* * * * *